(12) United States Patent
Recker et al.

(10) Patent No.: US 9,073,589 B2
(45) Date of Patent: Jul. 7, 2015

(54) PIN JOINT COMPONENT WITH IMPROVED WEAR SURFACES

(75) Inventors: Roger L. Recker, Dunlap, IL (US); Stan R. Parrott, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 296 days.

(21) Appl. No.: 12/909,455

(22) Filed: Oct. 21, 2010

(65) Prior Publication Data

US 2011/0135383 A1 Jun. 9, 2011

Related U.S. Application Data

(60) Provisional application No. 61/254,350, filed on Oct. 23, 2009.

(51) Int. Cl.
| | | |
|---|---|---|
| B62D 55/00 | (2006.01) | |
| B62D 55/21 | (2006.01) | |
| B62D 55/088 | (2006.01) | |
| F16G 13/06 | (2006.01) | |
| F16J 15/34 | (2006.01) | |

(52) U.S. Cl.
CPC .............. B62D 55/21 (2013.01); *Y10T 403/74* (2015.01); B62D 55/0887 (2013.01); *F16G 13/06* (2013.01); *F16J 15/344* (2013.01)

(58) Field of Classification Search
CPC ... B62D 55/088; B62D 55/0887; B62D 55/21
USPC ......................................... 305/102–106, 202
See application file for complete search history.

(56) References Cited

U.S. PATENT DOCUMENTS

| | | | |
|---|---|---|---|
| 4,295,654 A * | 10/1981 | Kawamura et al. | ............ 277/380 |
| 5,249,868 A * | 10/1993 | Watts | ............... 384/276 |
| 5,769,557 A | 6/1998 | Beals et al. | |
| 6,045,200 A | 4/2000 | Anderton et al. | |
| 6,074,022 A | 6/2000 | Anderton et al. | |
| 6,089,683 A | 7/2000 | Anderton | |
| 6,102,408 A * | 8/2000 | Anderton et al. | ............. 277/370 |
| 6,206,491 B1 | 3/2001 | Hisamatsu | |
| 6,371,577 B1 | 4/2002 | Hasselbusch et al. | |
| 6,478,388 B2 | 11/2002 | Maguire | |
| 6,564,539 B2 | 5/2003 | Bedford et al. | |
| 6,565,161 B2 | 5/2003 | Anderton | |
| 6,739,680 B2 | 5/2004 | Hasselbusch et al. | |
| 6,846,051 B2 | 1/2005 | Bottom et al. | |
| 6,948,784 B2 * | 9/2005 | Wodrich et al. | ............... 305/202 |
| 7,121,555 B2 | 10/2006 | Yamamoto et al. | |
| 7,347,513 B2 | 3/2008 | Johannsen et al. | |

(Continued)

FOREIGN PATENT DOCUMENTS

| | | |
|---|---|---|
| JP | 59053677 | 3/1984 |
| JP | 6247351 | 9/1994 |

*Primary Examiner* — Jason Bellinger
(74) *Attorney, Agent, or Firm* — Finnegan, Henderson, Farabow, Garrett & Dunner, LLP

(57) ABSTRACT

The present disclosure is directed to a pin joint component for a pin joint assembly that has improved wear surfaces, especially for those portions of the pin joint component surface that interface thrust rings, lips, and other adjacent wear components. The pin joint component comprises a first treated region that is formed by removing material from the wear surface of the pin joint component and replaced with clad material. Prior to this operation, a second treated region is formed by removing material from a section of the pin joint component distinct from the first treated region and performing a nitriding process thereon.

18 Claims, 9 Drawing Sheets

(56) References Cited

U.S. PATENT DOCUMENTS

| | | | |
|---|---|---|---|
| 2003/0106617 A1* | 6/2003 | Black et al. | 148/219 |
| 2003/0111905 A1 | 6/2003 | Takayama | |
| 2006/0022411 A1 | 2/2006 | Beardsley et al. | |
| 2006/0181151 A1 | 8/2006 | Wodrich et al. | |
| 2008/0164756 A1 | 7/2008 | Yamamoto et al. | |
| 2009/0108541 A1 | 4/2009 | Beardsley et al. | |
| 2010/0090523 A1* | 4/2010 | Grenzi | 305/104 |

* cited by examiner

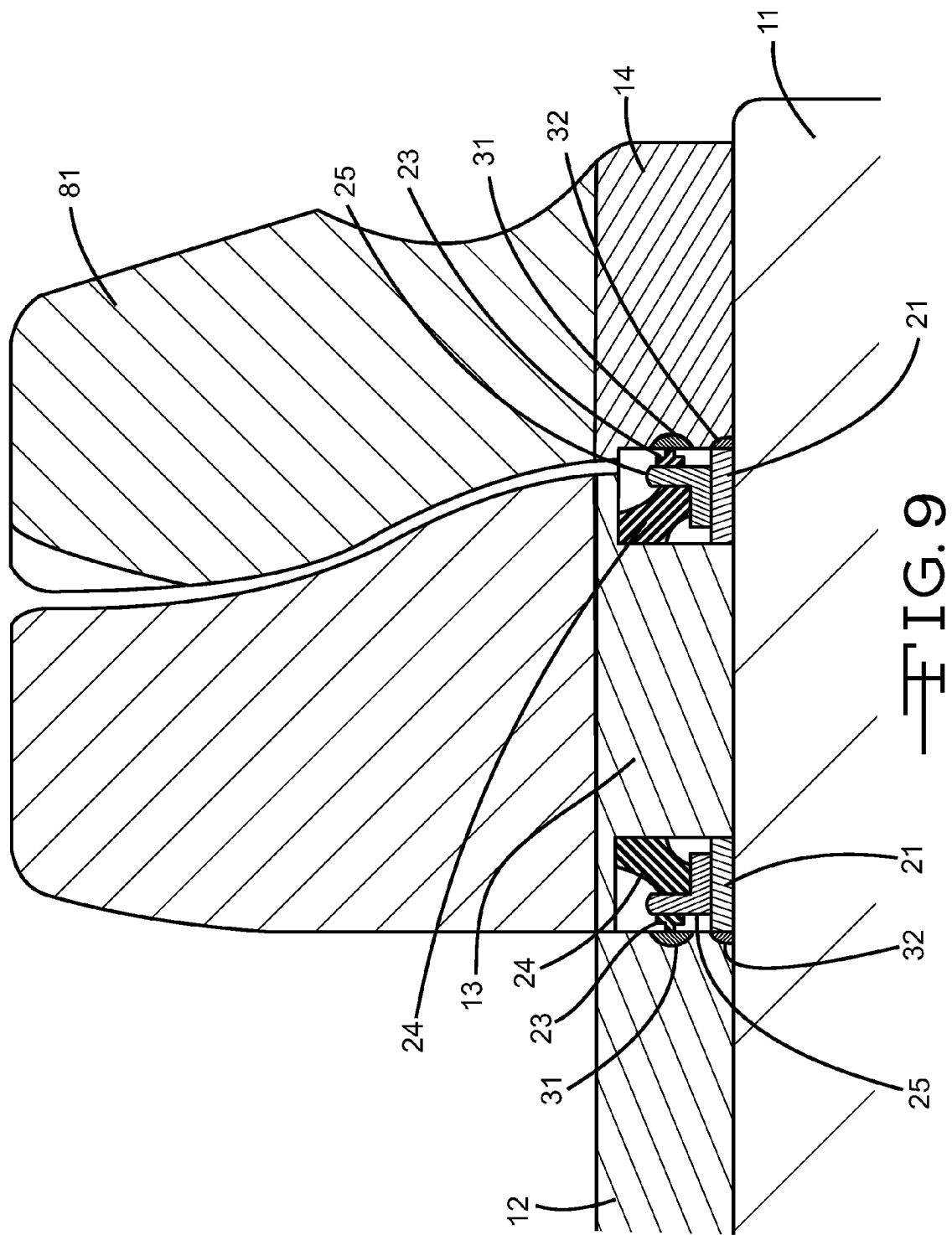

PIN JOINT COMPONENT WITH IMPROVED WEAR SURFACES

This application claims the benefit of priority under 35 U.S.C. §119(e) of U.S. provisional application No. 61/254,350, filed Oct. 23, 2009.

TECHNICAL FIELD

The present invention relates generally to pin joint components. More particularly, the present invention relates to pin joint assembly collars, inserts, bushings, and track links that are treated with at least two distinct surface treatments.

BACKGROUND

Pin joints are commonly used in numerous work machine applications, such as in track chains or undercarriage systems, linkage pins, or boom pin joints. Typically, the pin joint components are made of a general use steel with limited surface treatment. Moreover, multiple surface treatments on the same component or surface of a component are technologically challenging, as use of multiple surface treatments commonly encounters the problem of subsequent treatments offsetting the effectiveness of the earlier surface treatment(s).

The vast majority of improvements related to improving pin joint wear resistance are directed to sealing technology, such as that disclosed in U.S. Pat. No. 7,121,555, issued to Yamamoto et al. Despite Yamamoto et al.'s advances, they do not address improvements related to the pin joint components, and certainly not to creating a pin joint component with multiple surface treatments.

SUMMARY OF THE INVENTION

In one aspect, the present disclosure is directed to a pin joint component comprising a main body having an outer wear surface including a first treated region and a second treated region proximate to the first treated region. The first treated region includes clad alloy material, while the second treated region includes a nitrided surface.

In another aspect, the present disclosure is directed to a method for forming a pin joint component comprising the following steps: forging an alloy into the general shape of the pin joint component; removing material from a wear surface of the pin joint component to form a second treated region; nitriding the second treated region; removing material from the outer wear surface of the pin joint component to form a first treated region; and cladding an alloy to the first treated region.

In yet another aspect, the present disclosure is directed to a pin joint assembly comprising a pin joint component that has a main body. The main body includes a wear surface with (i) a first treated region, (ii) a second treated region that is not co-planar with the outer wear surface, (iii) a shoulder between the first treated region and second treated region having a width of at least about 1 mm, and (iv) a channel between the shoulder and the second treated region. Further, the first treated region includes clad stainless steel alloy, and the second treated region includes a nitrided surface having a hardness of at least about 55 HRC and extends below the surface at least about 0.15 mm.

BRIEF DESCRIPTION OF THE DRAWINGS

FIG. 9 is a cross-sectional view of a pin joint assembly including a bushing and collar prepared according to the present disclosure.

Whenever possible, the same reference numbers will be used throughout the drawings to refer to the same or like parts.

DETAILED DESCRIPTION

The pin joint component disclosed herein has utility in various work machine applications, as detailed below. The following example of the use of the pin joint component in a track laying machine's undercarriage system is for example only, and is not presented in a limiting sense.

Figure 1:
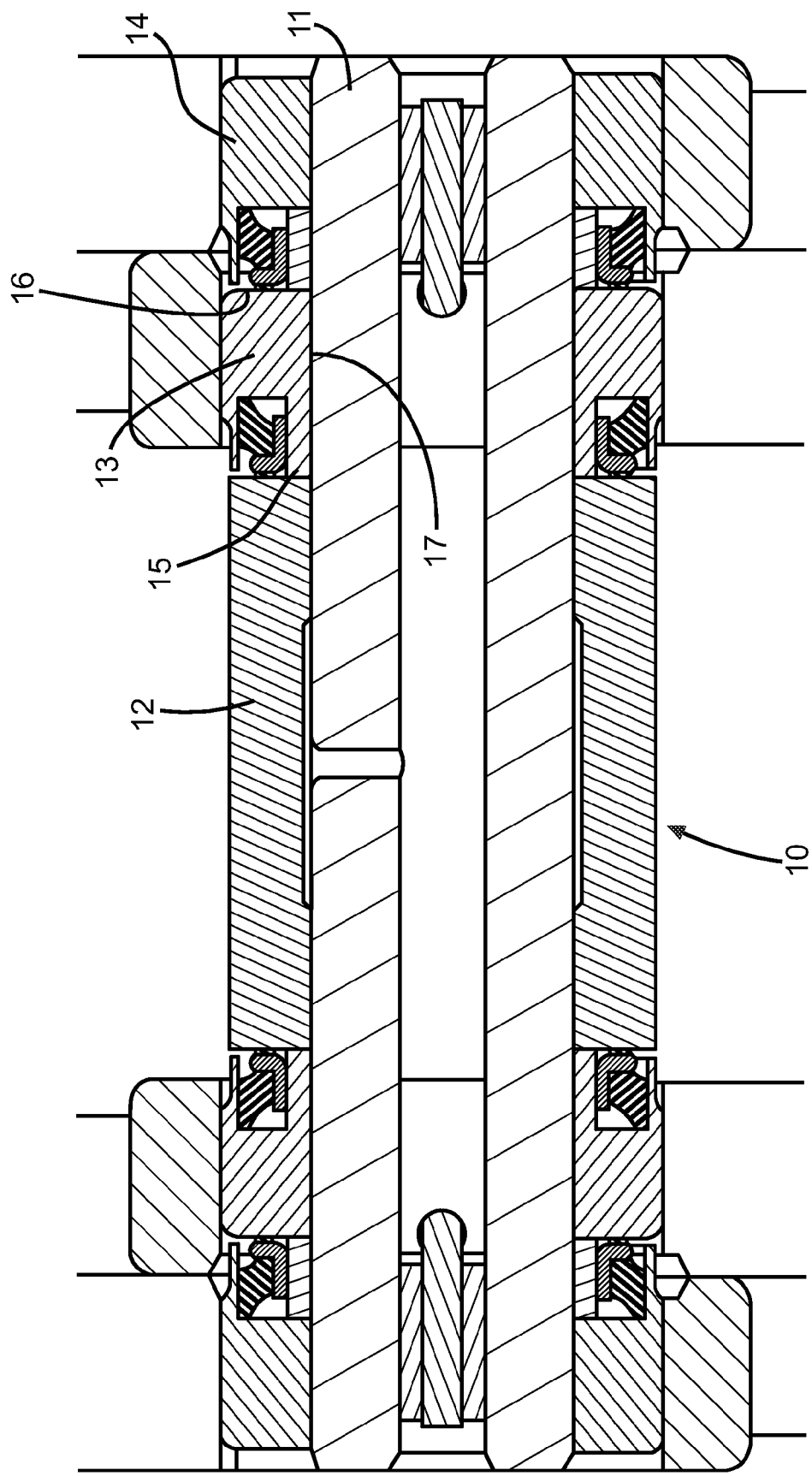
FIG. 1 is a schematic of a pin joint assembly.

Track laying machines utilize articulating track chains for propelling the machine over terrain during operation in, e.g., construction, mining, oil/gas, forestry, and other rugged operating environments. Such track chains are typically utilized in pairs disposed on each side of the machine. The track chain comprises a series of subassemblies, the number of which is determined by the desired length for a given application, with the opposite ends of each track chain being mechanically coupled together using master links to form a closed loop that typically extends about a drive sprocket and at least one idler. Each subassembly includes a track pin assembly, an inner and outer link, and a track shoe. As shown in FIG. 1, track pin assembly 10 includes a track pin 11, a bushing 12, a collar 14, and an insert 13, which is sometimes also referred to as a collar. Insert 13 includes a first end region 15, a wear edge 16, and a bore 17. Insert 13 may be fixed relative to track pin 11 so that insert 13 will not rotate or move axially relative to track pin 11. For example, insert 13 may be press fit onto, welded to, adhesive or chemically bonded to track pin 11, or another known manner of attaching two mechanical components. Over the course of operation, the constant metal-to-metal contact of the moving pin joint components can result in significant wear, even when measures are taken to minimize friction between these components.

Figure 2:
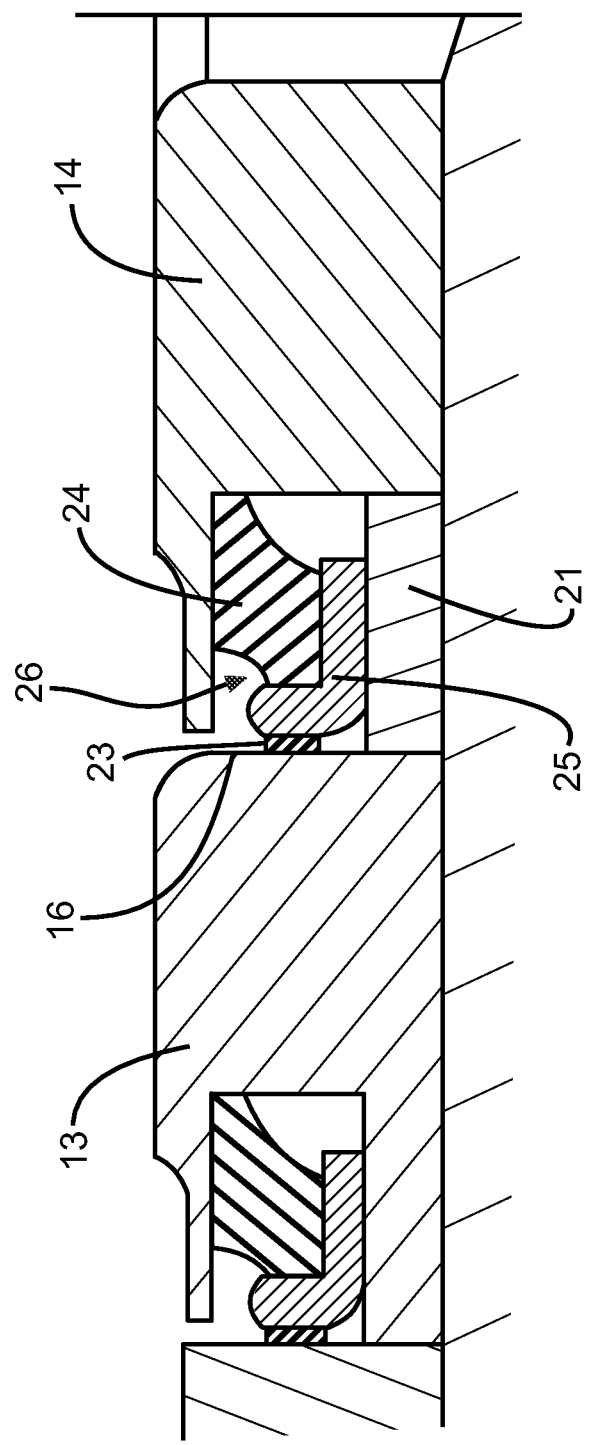
FIG. 2 is a schematic of the area of a pin joint assembly including a collar, an insert, and a seal assembly.
Figure 3:
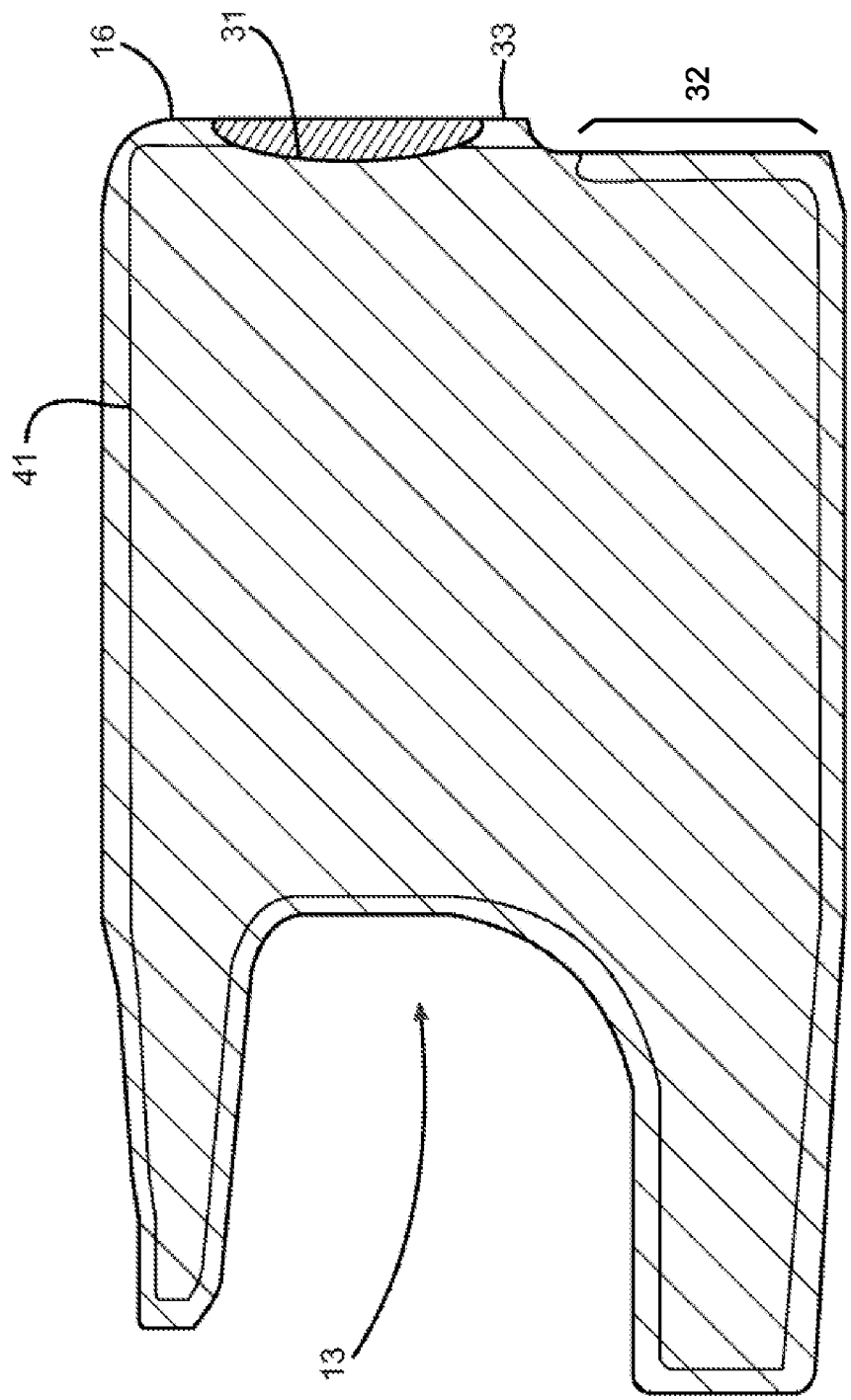
FIG. 3 is a cross-sectional view of an insert of the present disclosure, with first and second treated regions.

With reference to the drawings, FIG. 2 shows a cross section of a prior art track pin assembly component, specifically an insert 13 having a main body and wear surface 16 that is exposed to the operating environment, and collar 14. In prior art configurations, a thrust ring 21 is disposed adjacent to wear surface 16. Moreover, a lip 23 may also be disposed adjacent to wear surface 16 as part of a seal assembly 26, which also includes load ring 24 and can 25. When wear surface 16 is untreated, thrust ring 21 and lip 23 may unacceptably wear the wear surface 16 because, in the case of thrust ring 21, it is formed of a harder alloy than wear surface 16. In the case of lip 23, wear surface 16 may corrode because of environmental factors, such as exposure to basic or acidic slurries. Accordingly, as shown in FIG. 3, insert 13 includes a first treated region 31 that interfaces with lip 23 of the seal assembly and a second treated region 32 that interfaces thrust ring 21 on wear surface 16, with a shoulder 33 disposed between first treated region 31 and second treated region 32, wherein first treated region 31 and second treated region 32 are generally parallel to one another, but may not be coplanar.

To form insert 13, the general shape is formed with a forging and annealing process. Any suitable alloy may be used, such as, e.g., steels, including carbon steels and chromoly steels. Additional cold working is typically performed to further form insert 13, such as green turning and knurling insert 13.

Figure 4:
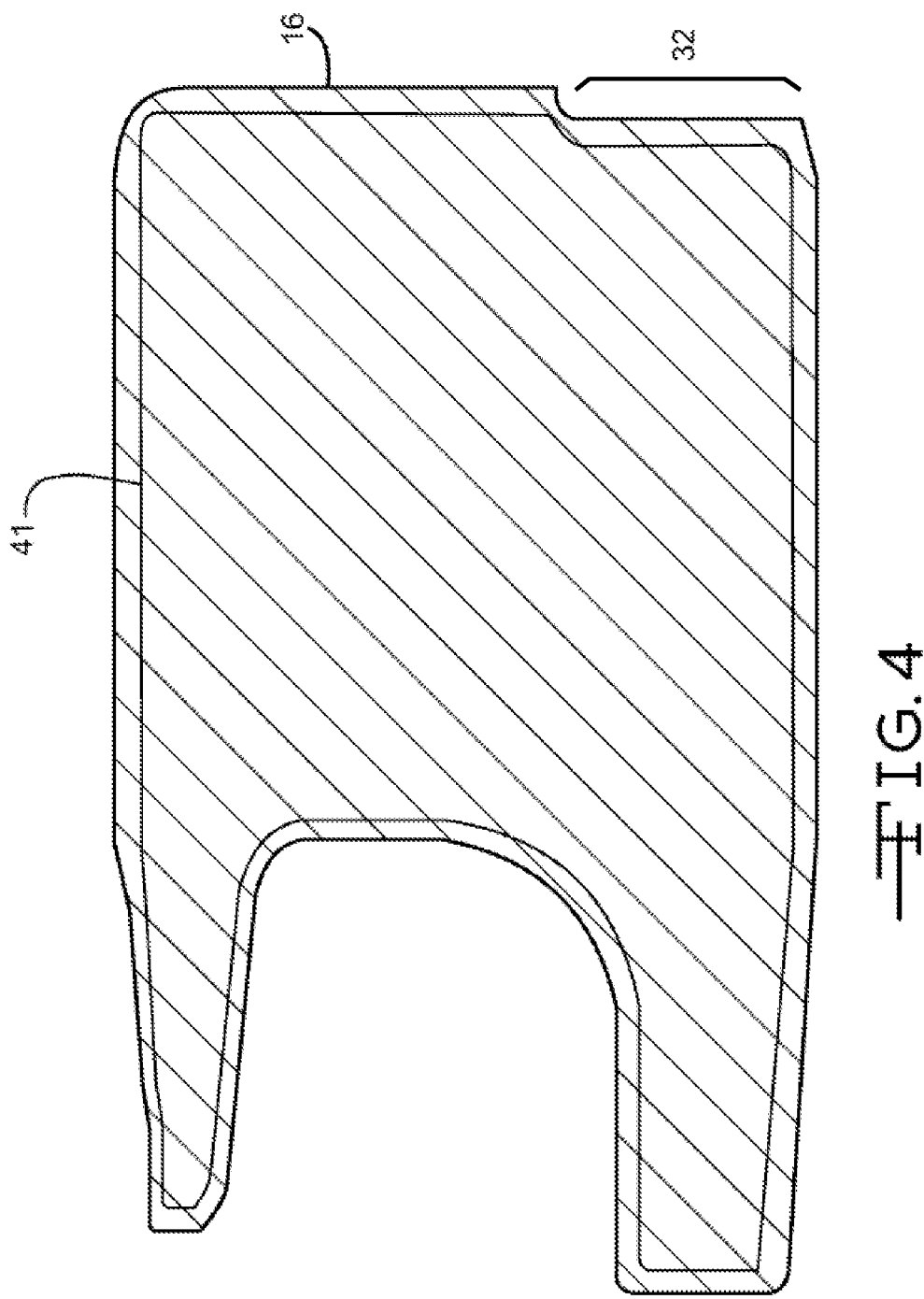
FIG. 4 is a cross-sectional view of the insert of the present disclosure having the second treated region exposed.

Referring to FIG. 4, material is removed from a portion of wear surface 16 that will form second treated region 32 after an optional neutral hardening step. The material removed may form any suitable shape for second treated region 32, such that second treated region 32 is non-planar with respect to wear surface 16. As shown in FIG. 4, one such shape is generally rectangular with an optional radial portion cut near shoulder 33. The depth of the material removal may be any suitable depth, and in one example the depth of material is at least about 0.1 mm, such as at least about 0.15 mm or 0.20 mm.

After said material removal step, second treated region 32 undergoes a nitriding step. The nitriding step includes standard steps known in the art in nitriding techniques such as gas nitriding, liquid or salt bath nitriding, ion nitriding, or plasma nitriding. FIG. 4 shows an embodiment wherein gas nitriding is employed to nitride the surfaces of insert 13 exposed to the gas nitriding process. The nitrided second treated region 32 has an average apparent hardness of at least about 45 HRC, such as at least about 47 HRC or even at least about 50 HRC. By "apparent hardness," this is the hardness garnered from a typical test using the HRC scale, which may be skewed downward because of the relatively thin layer of the nitrided second treated region 32 on the softer substrate, which may have a hardness of only about 42 HRC or less. The actual hardness of just the second treated region 32 may be substantially higher, such as at least about 55 HRC or even at least about 65 HRC.

The second treated region 32 extends below the surface of second treated region 32 at least about 0.1 mm deep, such as at least about 0.15 mm deep or at least about 0.20 mm deep. This nitrided case 41 is shown as the line that traces the contours of the outer surfaces of insert 13 in a somewhat or substantially uniform manner because of the gas nitriding process. Other nitriding processes may not result in such a substantially uniform case depth and may, in some processes, be localized solely to second treated region 32. It will be appreciated that the case may not represent a distinct drop in hardness resulting from the nitriding, but that the drop in hardness may be gradual.

Figure 5:
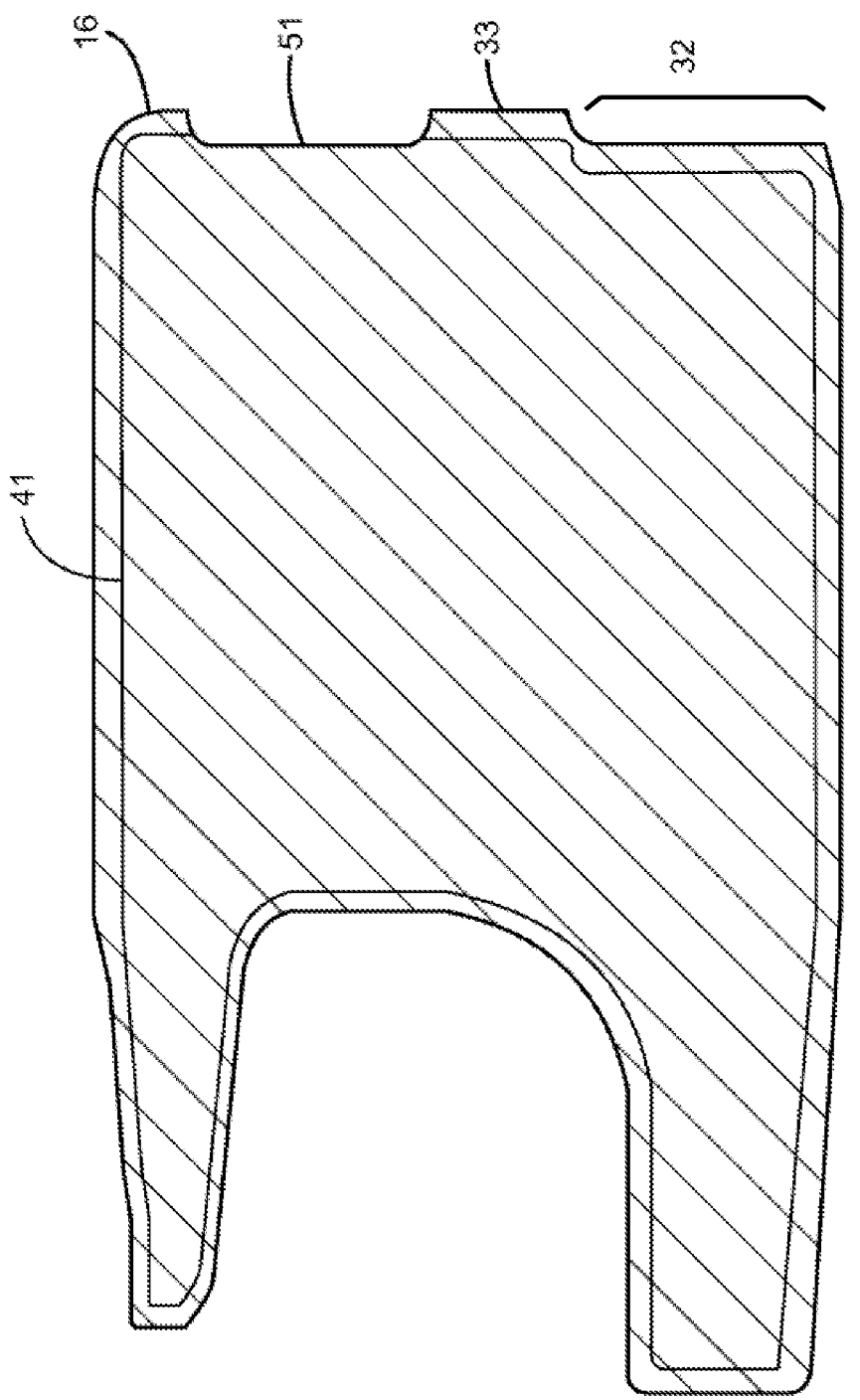
FIG. 5 is a cross-sectional view of the insert of the present disclosure having the first and second treated regions exposed.

After nitriding of second treated region 32, insert 13 undergoes another material removal step whereby material is removed from wear surface 16 in the area that will generally become first treated region 31. Specifically, as seen in FIG. 5, a portion of wear surface 16 will be retained as shoulder 33 while material is removed from wear surface 16 on the side of the shoulder distal from second treated region 32. Shoulder 33 should be of a width sufficient to prevent subsequent steps during treatment of first treated region 31 from significantly interacting with second treated region 32. Generally, shoulder 33 should be at least about 1 mm wide, such as at least about 2 mm wide or at least about 3 mm wide.

Referring again to FIG. 5, the material removed from wear surface 16 leaves a cavity 51 in wear surface 16 that is generally rectangular in shape, with an optional radial portion cut at either or both ends of the cavity. The cavity 51 is of a depth of between about 0.10 mm and about 4.0 mm, such as between about 0.8 mm and about 3.0 mm. The width of the cavity 51 is between about 1.0 mm and about 12.0 mm, such as between about 2.0 mm and about 10.0 mm or even between about 3.0 mm and about 7.5 mm.

Figure 6:
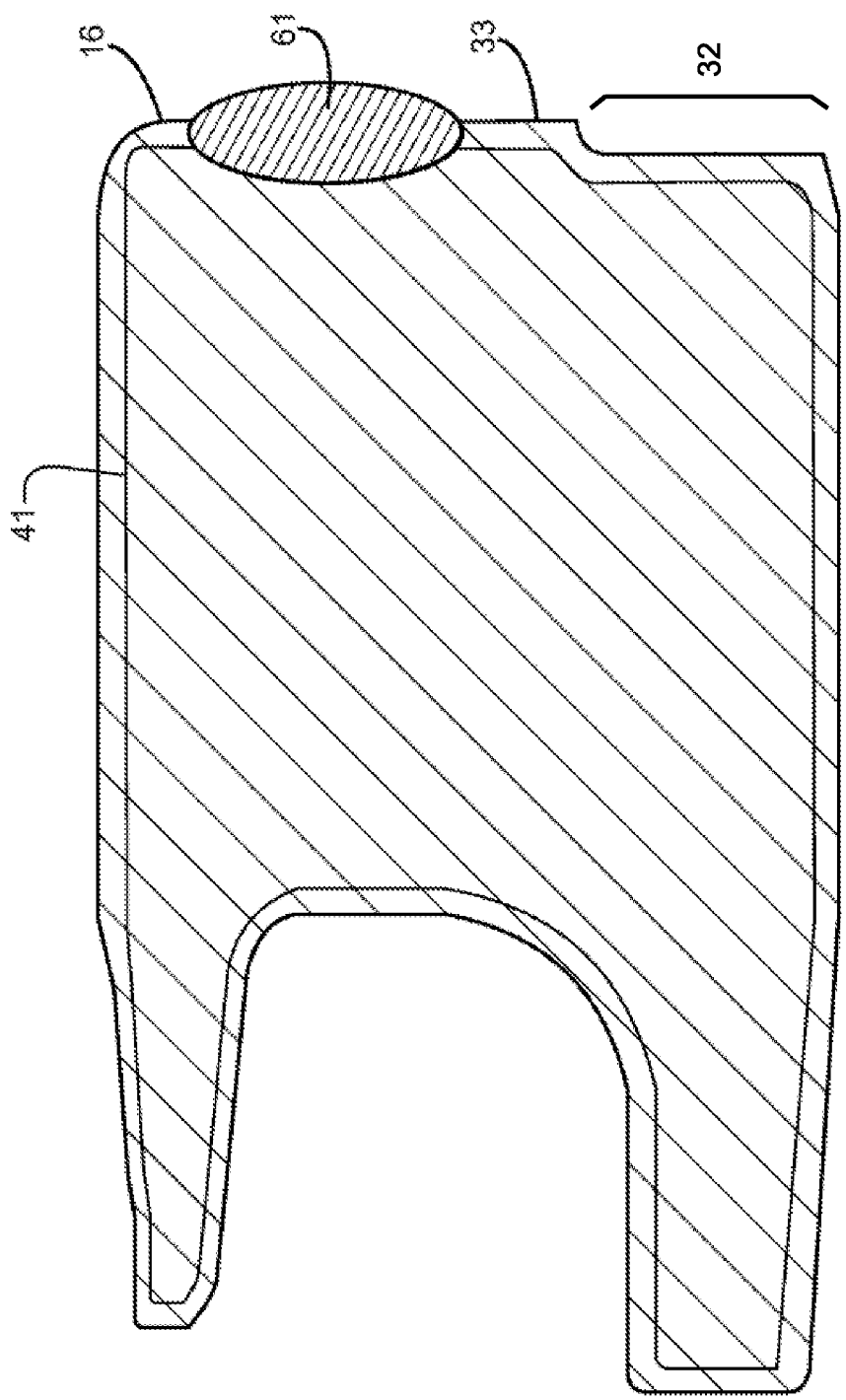
FIG. 6 is a cross-sectional view of the insert of the present disclosure having the clad alloy applied to the first treated region.

After this step, a cladding operation is used to fill cavity 51 formed in wear surface 16 with an alloy suitable for abutting lip 23 of a seal assembly. Specifically, stainless steel alloys or other corrosion resistant alloys are suitable for deposition as powder or wire feed stock using a cladding process. During the cladding operation, second treated region 32 is protected from any material runoff or splatter from the cladding process by the shoulder and, optionally, by placing a cap over the nitrided surface of second treated region 32. The resulting insert 13 is shown in FIG. 6, which shows how first treated region 31 has alloy clad to first treated region 31 to fill the cavity and produce build-up of additional alloy material 61.

Figure 7:
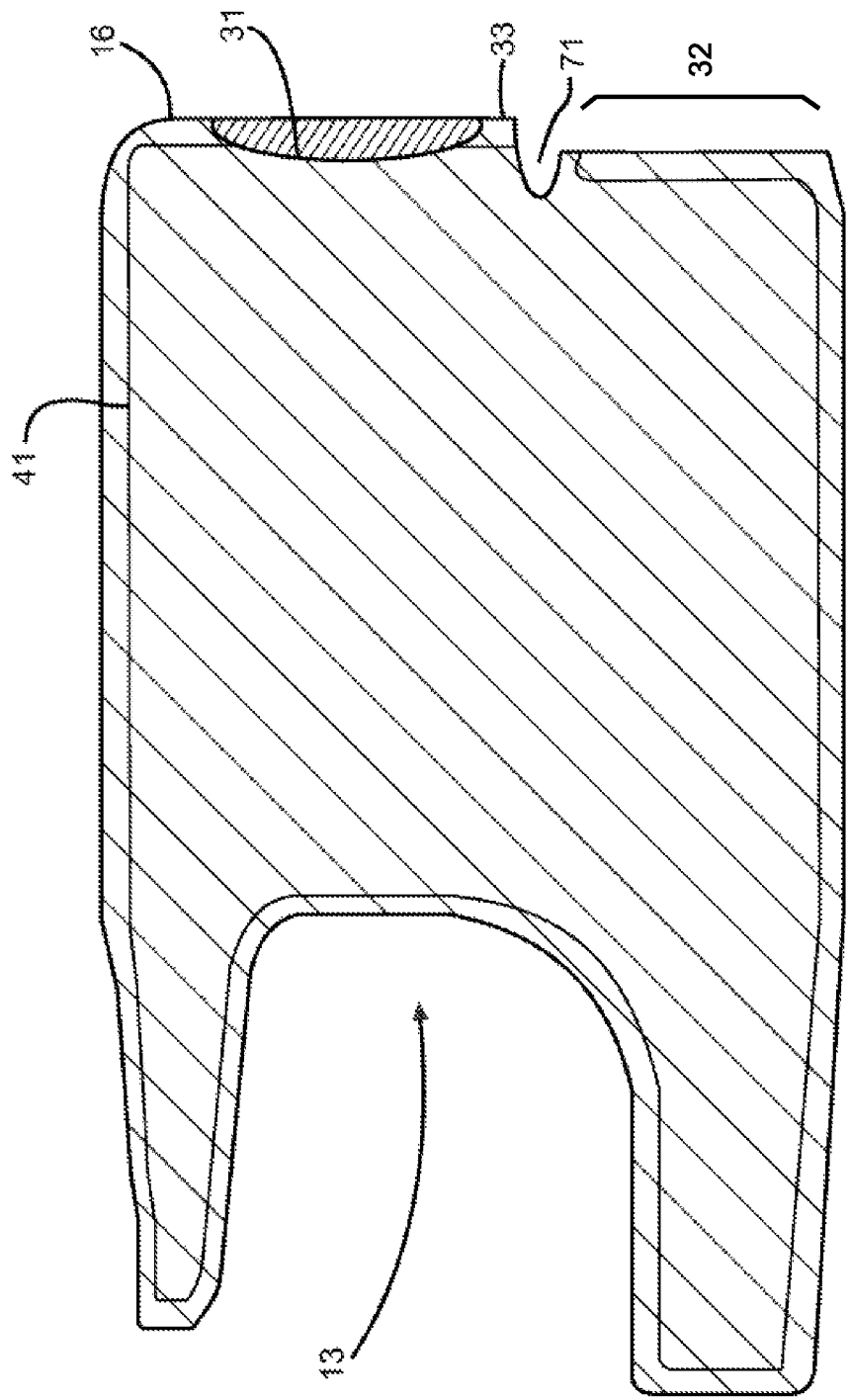
FIG. 7 is a cross-sectional view of the insert of the present disclosure having a channel disposed between the first and second treated regions.

The additional build-up of clad material is then removed with a cold working step of, e.g., hard turning. During this processing step, it is likely and anticipated that material will be removed from wear surface 16 as well, such that the final surface of wear surface 16, clad surface of first treated region 31, and shoulder 33 all undergo material removal. However, the amount of material removed is less than the depth of second treated region 32 so that first treated region 31 and second treated region 32 remain substantially parallel, yet non-planar with respect to one another. A final honing or polishing step may also be included. A channel 71 may optionally be formed between shoulder 33 and second treated region 32, as shown in FIG. 7. This channel 71 may help with seating of adjoining features, such as thrust ring 21.

Figure 8:
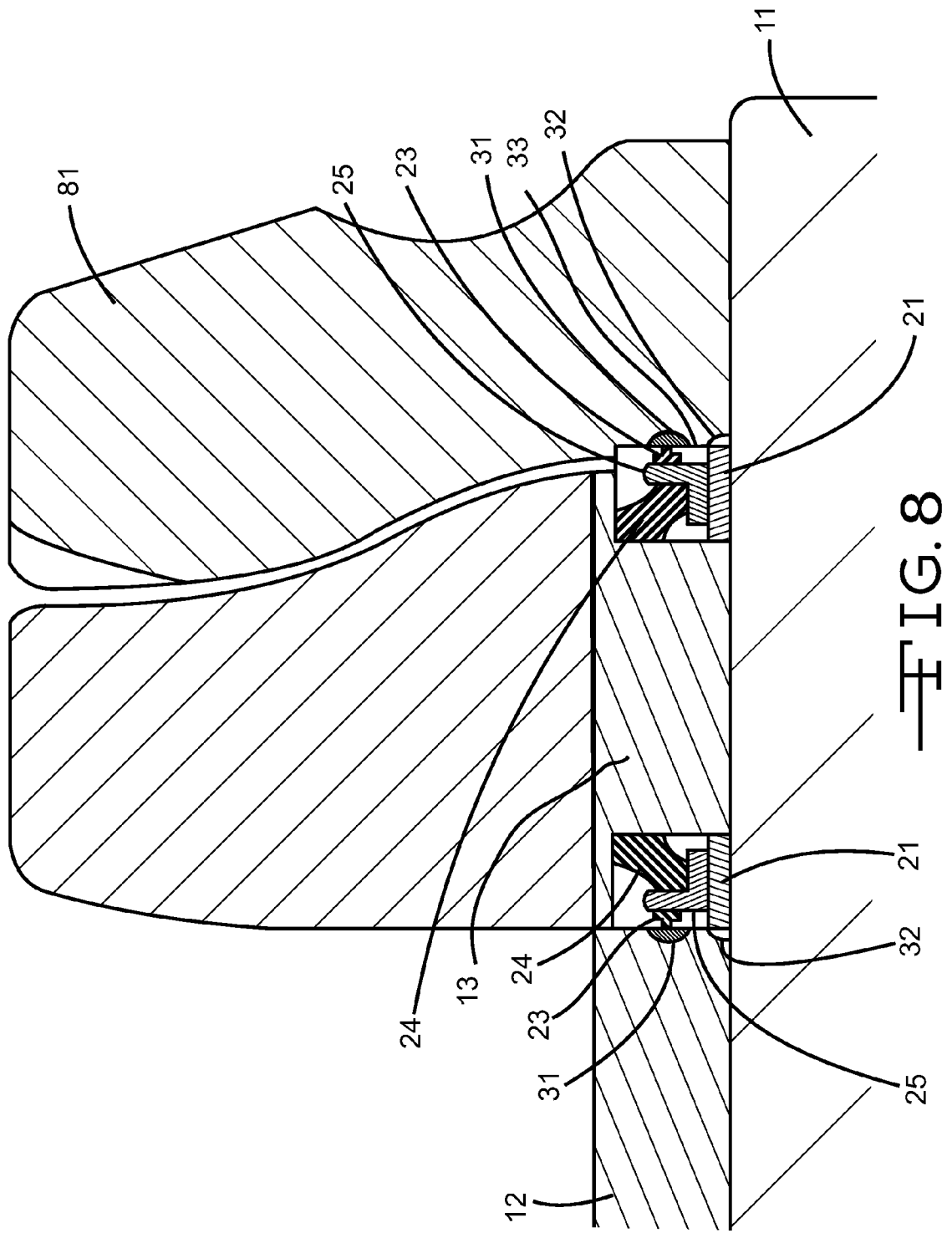
FIG. 8 is a cross-sectional view of a pin joint assembly including a bushing and track link prepared according to the present disclosure.

As seen in FIG. 8, a similar process may also be applied to other pin joint components, as insert 13 is reconfigured for this particular application. Specifically, the surface of bushing 12 that may interface with lip 23 and thrust ring 21 may undergo two similar localized processes. In particular, material is removed from a portion of the edge of bushing 12 that will form second treated region 32. The material removed may form any suitable shape for second treated region 32, such that second treated region 32 is non-planar with respect to the edge of bushing 12. One such shape is generally rectangular with an optional radial portion cut near shoulder 33.

After said material removal step, second treated region 32 undergoes a nitriding step, followed by another material removal step whereby material is removed from the edge of bushing 12 in the area that will generally become first treated region 31.

The material removed from bushing 12 leaves a cavity that is generally rectangular in shape, with an optional radial portion cut at either or both ends of the cavity. A cladding operation is then used to fill the cavity formed in bushing 12 with an alloy suitable for abutting lip 23 of a seal assembly. Build-up of additional alloy material 61 is expected during the cladding operation.

The additional build-up of clad material is then removed with a cold working step of, e.g., hard turning. During this processing step, it is likely and anticipated that material will be removed from bushing 12 as well, such that the final surface of the edge of bushing 12, clad surface of first treated region 31, and shoulder 33 all undergo material removal.

However, the amount of material removed is less than the depth of second treated region 32 so that first treated region 31 and second treated region 32 remain substantially parallel, yet non-planar with respect to one another. A final honing or polishing step may also be included.

Referring again to FIG. 8, similar localized processes may also be applied to another pin joint component, such as the inner surface of a track link 81 may interface with lip 23 and thrust ring 21 may undergo two similar localized processes. In particular, material is removed from a portion of track link 81 that will form second treated region 32. The material removed may form any suitable shape for second treated region 32, such that second treated region 32 is non-planar with respect to the side of track link 81. One such shape is generally rectangular with an optional radial portion cut near shoulder 33.

After said material removal step, second treated region 32 undergoes a nitriding step, followed by another material removal step whereby material is removed from the side of track link 81 in the area that will generally become first treated region 31.

The material removed from track link 81 leaves a cavity that is generally rectangular in shape, with an optional radial portion cut at either or both ends of the cavity. A cladding operation is then used to fill the cavity formed in track link 81 with an alloy suitable for abutting lip 23 of a seal assembly. Build-up of additional alloy material 61 is expected during the cladding operation.

The additional build-up of clad material is then removed with a cold working step of, e.g., hard turning. During this processing step, it is likely and anticipated that material will be removed from track link 81 as well, such that the final surface of the edge of track link 81, clad surface of first treated region 31, and shoulder 33 all undergo material removal. However, the amount of material removed is less than the depth of second treated region 32 so that first treated region 31 and second treated region 32 remain substantially parallel, yet non-planar with respect to one another. A final honing or polishing step may also be included.

Referring now to FIG. 9, similar localized processes may also be applied to another pin joint component, such as a collar 14, which is reconfigured along with insert 13 in this particular setting. Such a pin joint assembly may be referred to as a cartridge assembly. Collar 14 may interface with lip 23 and thrust ring 21, and may undergo two localized processes similar to the one described above for insert 13. In particular, material is removed from a portion of collar 14 that will form second treated region 32. The material removed may form any suitable shape for second treated region 32, such that second treated region 32 is non-planar with respect to the side of collar 14. One such shape is generally rectangular with an optional radial portion cut near shoulder 33.

After said material removal step, second treated region 32 undergoes a nitriding step, followed by another material removal step whereby material is removed from the side of track link 81 in the area that will generally become first treated region 31.

The material removed from collar 14 leaves a cavity that is generally rectangular in shape, with an optional radial portion cut at either or both ends of the cavity. A cladding operation is then used to fill the cavity formed in collar 14 with an alloy suitable for abutting lip 23 of a seal assembly. Build-up of additional alloy material 61 is expected during the cladding operation.

The additional build-up of clad material is then removed with a cold working step of, e.g., hard turning. During this processing step, it is likely and anticipated that material will be removed from collar 14 as well, such that the final surface of the edge of collar 14, clad surface first treated region 31, and shoulder 33 all undergo material removal. However, the amount of material removed is less than the depth of second treated region 32 so that first treated region 31 and second treated region 32 remain substantially parallel, yet non-planar with respect to one another. A final honing or polishing step may also be included.

Industrial Applicability

The insert 13 formed according to the present disclosure is especially suitable for use in a pin joint assembly for use in an undercarriage system of a tracked machine. For example, the insert may be part of the pin joint assembly described above as part of the endless track system used on a track type tractor, a tracked excavator, and other tracked work machines.

Moreover, insert 13 of the immediate disclosure may be employed in any setting with a similar pin joint configuration where a thrust ring or other similar hard component abuts insert 13, leading to excessive wear during operation. Such examples include the above described bushing, track link, or collar surfaces.

Testing has shown that the dual treatment of wear surface 16 with a first treated region 31 and a second treated region 32 according to the present disclosure may increase wear resistance of the treated surface of the pin joint component by ten times over conventional pin joint component designs.

Although the present disclosure has been described with reference to exemplary embodiments, workers skilled in the art will recognize that changes may be made in form and detail without departing from the spirit and scope of the invention. For example, although different exemplary embodiments may have been described as including one or more features providing one or more benefits, it is contemplated that the described features may be interchanged with one another or alternatively be combined with one another in the described exemplary embodiments or in other alternative embodiments. The present disclosure described with reference to the exemplary embodiments and set forth in the flowing claims is manifestly intended to be as broad as possible.

What is claimed is:

1. A pin joint component comprising:
 a main body having an outer wear surface including:
  a first treated region;
  a second treated region proximate to the first treated region; and
  a shoulder disposed between the first treated region and the second treated region, wherein
   the first and second treated regions are parallel to one another;
   the first treated region includes clad alloy material for interfacing with a first operational environment; and
   the second treated region includes a nitrided surface for interfacing with a second operational environment different from the first operational environment.

2. The pin joint component of claim 1 wherein the pin joint component is selected from the group of components consisting of collars, bushings, inserts, and track links.

3. The pin joint component of claim 1, wherein the clad alloy material is a stainless steel.

4. The pin joint component of claim 1, wherein the second treated region includes a portion that is not co-planar with the first treated region.

5. The pin joint component of claim 1, wherein the second treated region has a hardness of at least 45 HRC.

6. The pin joint component of claim 1 including a channel disposed between the first treated region and the second treated region.

7. The pin joint component of claim 1, wherein the shoulder is at least 1 mm wide.

8. A pin joint assembly comprising:
a pin joint component having a main body with a wear surface including a first treated region, a second treated region that has a portion not co-planar with the first treated region, a shoulder between the first treated region and the second treated region having a width of at least 1 mm, and a channel between the shoulder and the second treated region, wherein:
the first and second treated regions are parallel to one another;
the first treated region includes clad stainless steel alloy for interfacing with a first operational environment; and
the second treated region includes a nitrided surface for interfacing with a second operational environment different from the first operational environment, the nitrided surface having a hardness of at least 45 HRC, the second treated region extending below the nitrided surface at least 0.15 mm.

9. The pin joint assembly of claim 8 wherein the pin joint component is selected from the group of components consisting of collars, bushings, inserts, and track links.

10. The pin joint component of claim 1, wherein the first and second treated regions of the outer wear surface are configured to contact two different parts of neighboring pin joint components with the first and second operational environments, respectively.

11. The pin joint component of claim 1, wherein the first treated region is configured to contact a sealing assembly having the first operational environment, and the second treated region is configured to contact a thrusting ring having the second operational environment.

12. The pin joint assembly of claim 8, wherein the first and second treated regions of the outer wear surface are configured to contact two different parts of neighboring pin joint components with the first and second operational environments, respectively.

13. The pin joint assembly of claim 8, wherein the first treated region is configured to contact a sealing assembly having the first operational environment, and the second treated region is configured to contact a thrusting ring having the second operational environment.

14. A pin joint component comprising:
a main body having an outer wear surface including:
a first treated region;
a second treated region facing substantially a same direction as the first treated region, the first and second treated regions being configured to contact two different parts of neighboring pin joint components with a first operational environment and a second operational environment, respectively; and
a shoulder disposed between the first region and the second region, wherein
the first treated region includes clad alloy material for interfacing with the first operational environment of one of the two different parts of neighboring pin joint components; and
the second treated region includes a nitrided surface for interfacing with a second operational environment of the other of the two different parts of neighboring pin joint components.

15. The pin joint component of claim 14, wherein the two different parts of neighboring pin joint components comprise a part of a sealing assembly and a part of a thrusting ring, respectively.

16. The pin joint component of claim 15, further comprising a channel between the first treated region and the second treated region, wherein the channel is configured to receive a portion of the thrust ring.

17. The pin joint component of claim 14, wherein the second treated region includes a portion that is not co-planar with the first treated region.

18. The pin joint component of claim 14, wherein the first and second treated regions are parallel to one another.

\* \* \* \* \*